United States Patent
Soemer

Patent Number: 6,074,146
Date of Patent: Jun. 13, 2000

[54] SELF-ALIGNING CONNECTOR

[75] Inventor: John William Soemer, Whippany, N.J.

[73] Assignee: Lucent Technologies, Inc., Murray Hill, N.J.

[21] Appl. No.: 09/250,077

[22] Filed: Feb. 12, 1999

[51] Int. Cl.$^7$ .............................. F16B 21/18; F16B 39/00
[52] U.S. Cl. ......................... 411/353; 411/107; 411/112; 411/999
[58] Field of Search .................................. 411/352, 353, 411/107, 970, 999, 111, 112; 29/525.02

[56] References Cited

U.S. PATENT DOCUMENTS

| | | | |
|---|---|---|---|
| 2,460,613 | 2/1949 | Whelan et al. | 411/999 X |
| 2,922,456 | 1/1960 | Kann | 411/353 |
| 3,295,578 | 1/1967 | Maloof | 411/999 X |
| 3,343,581 | 9/1967 | Martin et al. | 411/999 X |
| 3,465,803 | 9/1969 | Ernest et al. | 411/999 X |
| 4,790,702 | 12/1988 | Maganias | 29/525.02 X |
| 5,059,075 | 10/1991 | Kelly | 411/999 X |

*Primary Examiner*—Neill Wilson
*Attorney, Agent, or Firm*—Schnader, Harrison, Segal & Lewis LLP

[57] ABSTRACT

A self aligning connector to engage with a tapered surface of a body to be connected, having a head with a tapered surface capable of engaging the tapered surface of the body to be connected to the receiving body, a shaft portion having threads capable of threadingly engaging threads of the receiving body, a retainer sized and shaped to engage the shaft portion and to seat against a retaining surface of the body to be connected, and a substantially conical spring having an end portion engaging the head and/or shaft portion and another end engaging a surface of the body to be connected opposing the retaining surface and biasing the head and/or shaft portion away from the receiving body.

21 Claims, 4 Drawing Sheets

SELF-ALIGNING CONNECTOR

BACKGROUND OF THE INVENTION

1. Field of the Invention

The present invention is directed to a self aligning connector, particularly to a connector assembly that both locks and guides a door to a wall component.

2. Description of the Prior Art

A common type of connector to secure doors or panels is a draw latch. Typically, a draw latch has a base, a lever, and a catch, where the catch is adapted for engaging a keeper in a fastened position. The base and lever are pivotally connected to each other, and the catch and lever are pivotally connected to each other. An example of a draw latch is found in Gromotka, U.S. Pat. No. 5,478,125, which discloses a draw latch with a catch having a kick-out action. This draw latch has a base, a lever, and a latching member that engages with a keeper in a fastened position, and camming means for rotating the latching member from a closed position to an open position when released from being fastened.

A problem with draw latches is that they are restricted in use to act as a lock on a conventional door. An L-shaped or right angled door tends to sag. Therefore, a guide and lock are needed. A typical door latch locks the door, while additional guide studs are needed to align the door. To align the door using a draw latch, the door is lifted and then clamped.

One embodiment of the connector of the invention has some relation to a lug nut for an automobile wheel assembly, where lug nuts center and align a wheel. A lug nut assembly has a retention nut having an internally threaded bore for engagement with a threaded portion of a lug stud extending from a vehicle wheel mounting hub. For example, Henriksen, U.S. Pat. No. 5,827,025, discloses a lug nut with a disc spring. More specifically, a lug bolt passes through a mounting hole of a wheel rim, a tensioning disc spring assembly is provided on the lug bolt, and a nut is screwed onto the lug bolt so that the disc spring flattens when a preselected torque is achieved. In this assembly, the disc spring keeps the nut tight on the rim.

SUMMARY OF THE INVENTION

The latch of the present invention solves the problems of the prior art by providing a guide and lock in one device to stop sagging of the L-shaped door. The present invention uses a connector such as a nut and bolt assembly to center and align a door. The tapered head of the connector guides and aligns the door, and a shaft portion of the connector provides a locking mechanism between the door and a wall component to which the door is to be connected. A spring is also incorporated in the bolt, or connector, of the invention. The spring, as well as a retainer, prevents the connector from detaching from a door.

More particularly, the connector of the invention has a head having a tapered surface capable of engaging a tapered surface of a body to be connected and a shaft portion. The connector is located within an aperture of the body to be connected. In a preferred embodiment, external threads are positioned on at least a portion of the shaft portion and capable of threadingly engaging internal threads of a receiving body. A conical spring connects to one end of a retaining surface and to the head, shaft portion, or both at another end. The conical spring biases the connector away from the receiving body to keep the body to be connected flush and keep the connector inside the body to be connected. A retainer, sized and shaped to engage the shaft portion and to seat against the retaining surface at an opposite end of the spring, retains the connector. The retainer also prevents the connector from sliding out of the body to be connected.

When the body to be connected is closed, the external threads of the shaft portion engage with the internal threads of the receiving body. As the connector is tightened, vertical and horizontal alignment are achieved as the tapered surface of the head engages with the tapered surface of the body to be connected and sagging of the body to be connected is eliminated. Two or more connectors are used to determine a guide line for door alignment, or alternatively, one connector may be used with a dual position hinge.

In an alternative embodiment, the connector has a head having a tapered surface and a shaft portion having an inner wall, preferably, with threads on at least a portion of the inner wall. The threads on the inner wall engage with external threads on a stud located in a receptacle within the receiving body. In yet another embodiment, the connector may be a captive nut spring

DETAILED DESCRIPTION

The invention will be understood more fully from the detailed description given below and from accompanying drawings of preferred embodiments of the invention, which however, should not be taken to limit the invention to a specific embodiment, but are for explanation and understanding only.

Figure 1A:
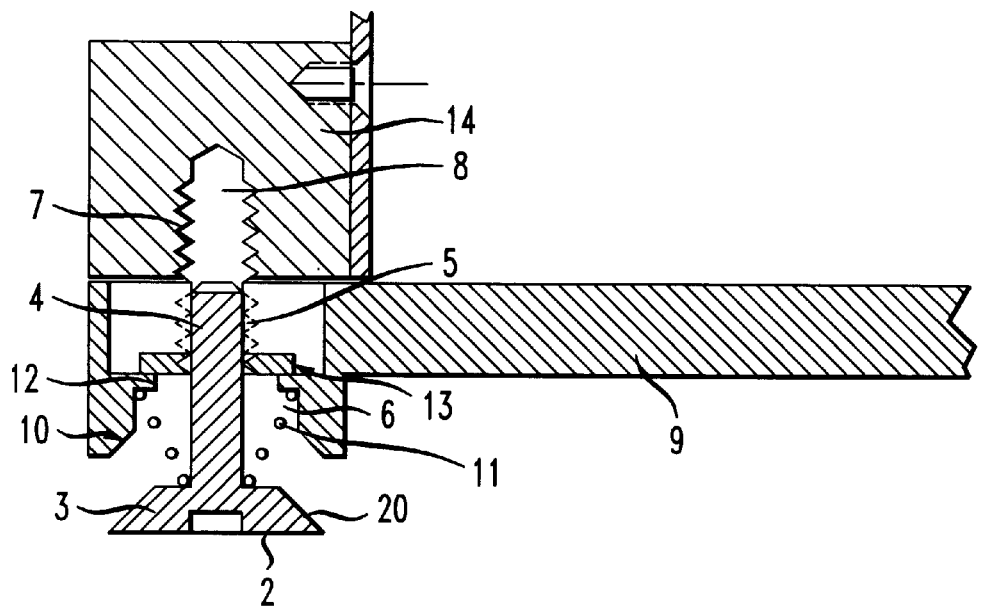
FIG. 1A is a sectional view of the preferred embodiment of the invention.

As shown in FIG. 1A, connector 2 has a head 3 having a tapered surface 20 and a shaft 4. Preferably, connector 2 is a flathead screw with a truncated shaft portion, but may be a bolt or other suitable connector. In a preferred embodiment, the shaft 4 is substantially cylindrical and has external threads 5 on the outside of a portion of the shaft 4. The connector 2 is located within an aperture 6 of a body to be connected or door 9, and the head 3 is capable of engaging a tapered surface 10 of door 9. A substantially conical spring 11 is attached at one end to a retaining surface 12 within aperture 6 of door 9 and at another end to head 3, shaft 4, or both. Conical spring 11 biases connector 2 away from a receiving body 14 so that connector 2 is flush within door 9 and connector 2 remains in door 9. Door 9 slides along receiving body 14 as it is closed, so connector 2 must be within door 9. Receiving body 14 may be a cabinet or a cabinet with a nut or nut block. Conical spring 11 is preferred in the connector assembly because it is smaller at head 3 and can collapse inside itself when connector 2 engages with receiving body 14.

A retainer 13, sized and shaped to engage shaft 4 and to seat against retaining surface 12 at an opposite end of spring 11, retains connector 2. Retainer 13 also prevents connector 2 from sliding out of door 9 when door 9 is in an open position and when connector 2 contacts receiving body 14.

Examples of applicable retainers include threaded washers, rubber washers, and C-rings having an inner diameter smaller than an outer diameter of shaft 4. Preferably, the external threads 5 are capable of threadingly engaging internal threads 7 within a recess 8 of receiving body 14. It should be understood that connector 2 may have a sharp end, which is capable of forming threads in the receiving body 14 as the connector 2 is connected to receiving body 14.

Figure 1B:
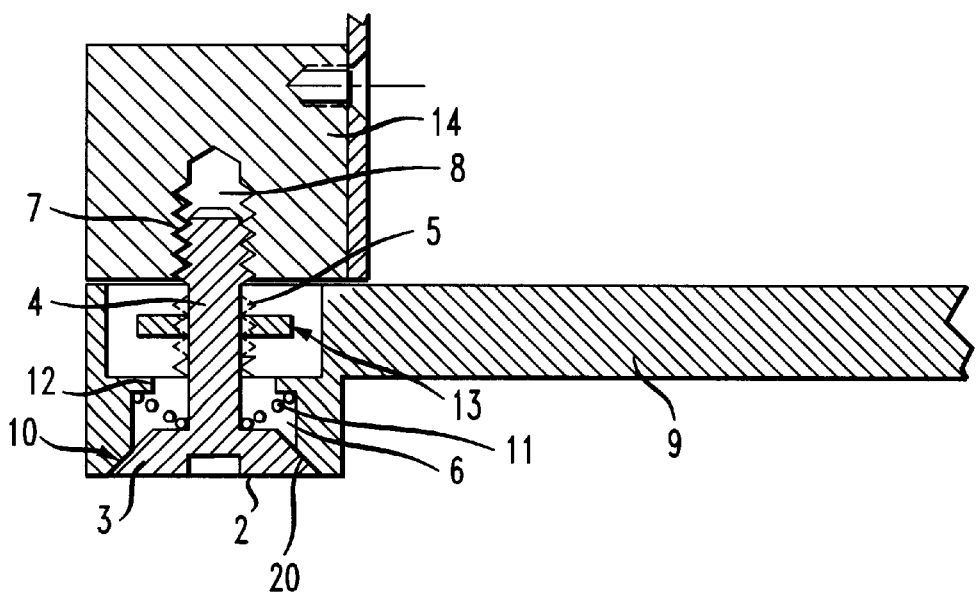
FIG. 1B is a sectional view of the connector of FIG. 1A at point of engagement.
Figure 1C:
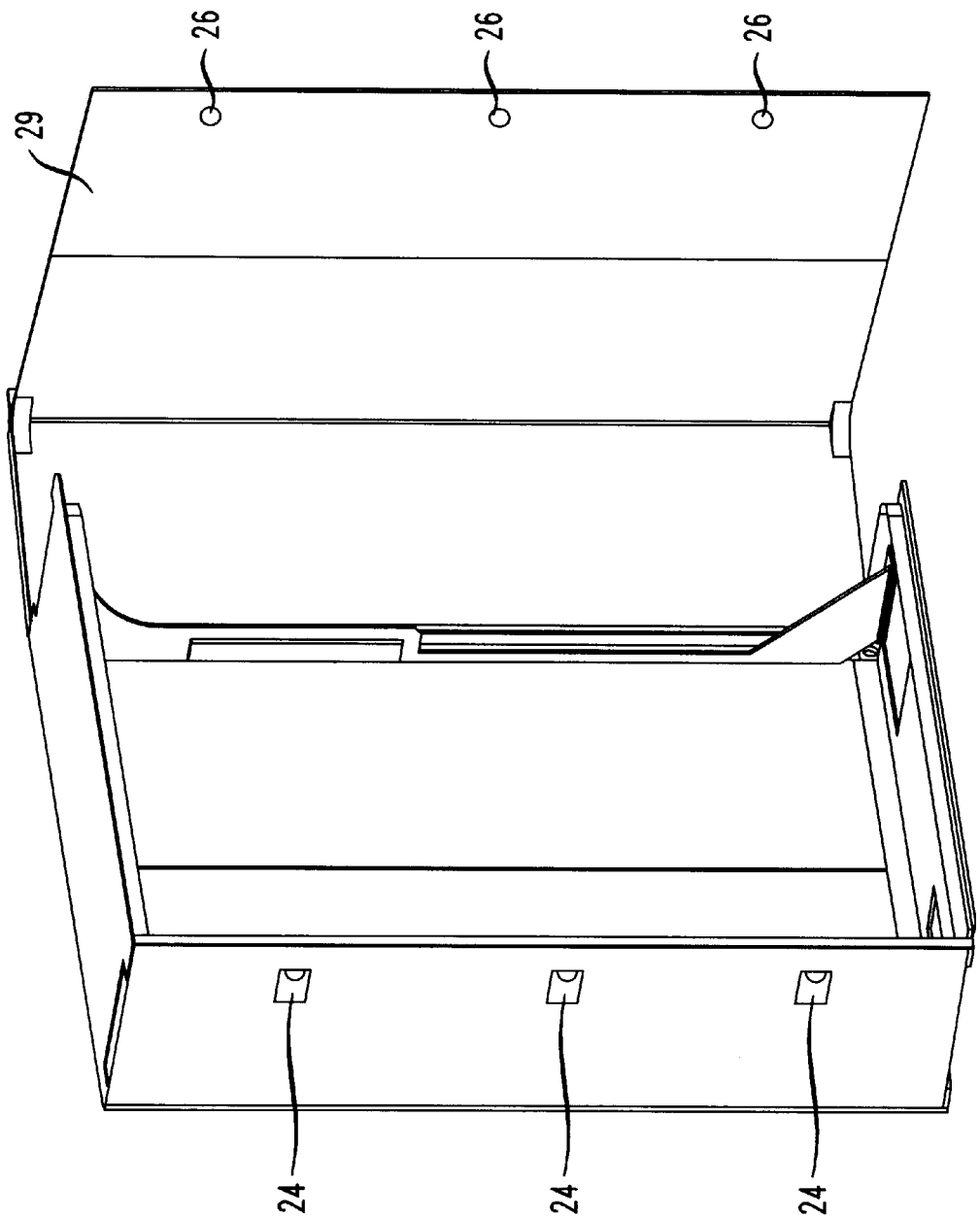
FIG. 1C is a perspective view of a receiving body and a body to be connected in an open position.

When the door 9 is open, or not engaging with receiving body 14, spring 11 and retainer 13 keep connector 2 inside door 9 and prevent connector 2 from sliding out of aperture 6. This is particularly useful when the receiving body 14 is mounted to a telephone pole and door 9 is opened to repair electronics inside receiving body 14. As a result, a worker will have easy access to electronics inside receiving body 14 and not lose connector 2 while repairing the electronics. When door 9 is in a closed position, connector 2 is tightened with a screwdriver, Allen wrench, socket wrench, or equivalent device. As connector 2 is tightened, as shown in FIG. 1B, tapered surface 20 aligns with tapered surface 10 of door 9 to center door 9. If door 9, particularly an L-shaped door, is sagging, it may be adjusted by tightening connector 2. As a result of this assembly, the connector 2 simultaneously aligns the door 9 in the x-axis and y-axis directions, while providing clamping force in the z-axis direction. The connector 2 also allows a precise gap for a gasket in a cabinet (not shown). To align and clamp door 9, preferably, at least two connectors should be installed on door 9. As shown in FIG. 1C, apertures 26 on door 29 are provided to fit a body, or nut block 24.

Figure 2:
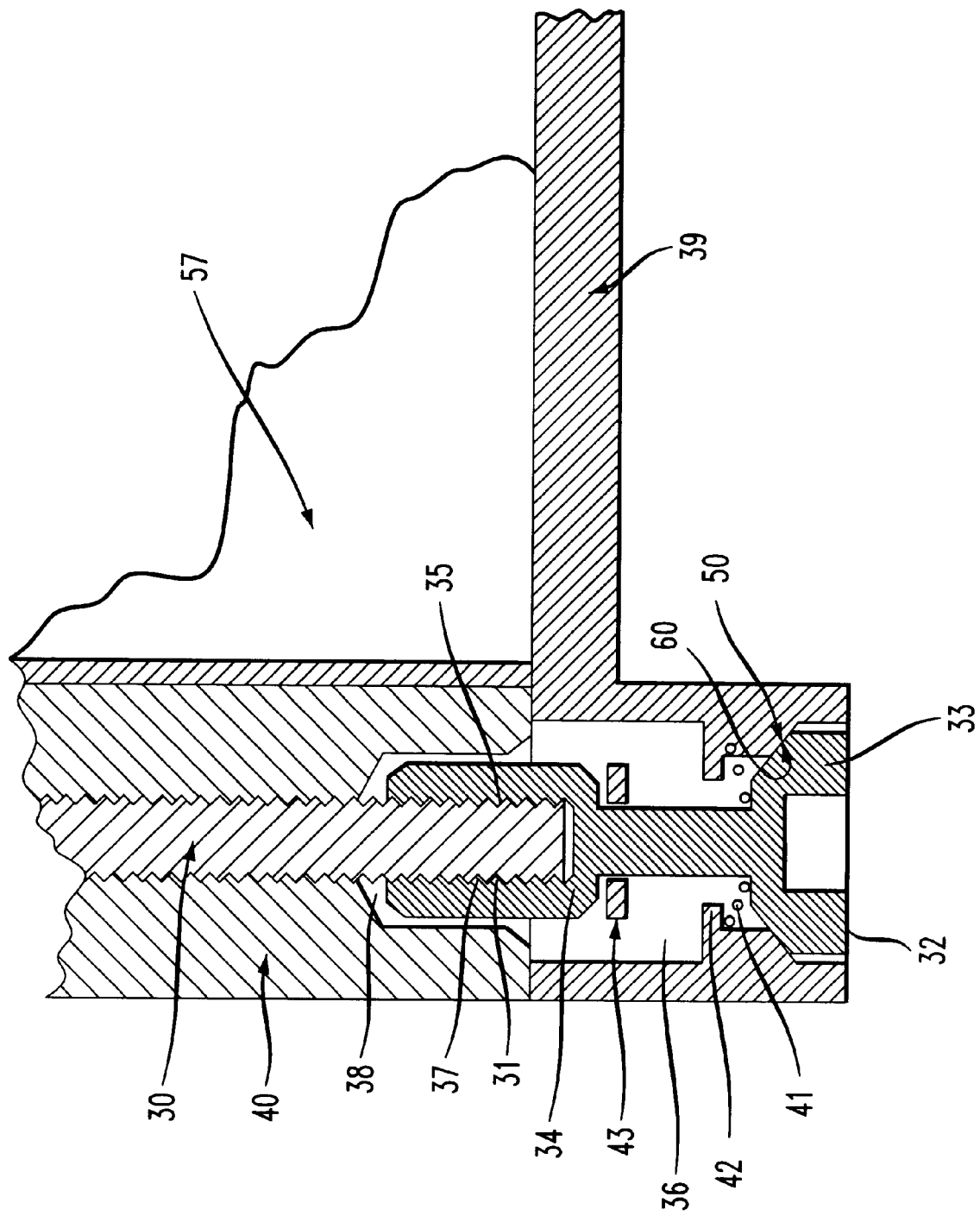
FIG. 2 is a sectional view of another embodiment of the invention.
Figure 3:
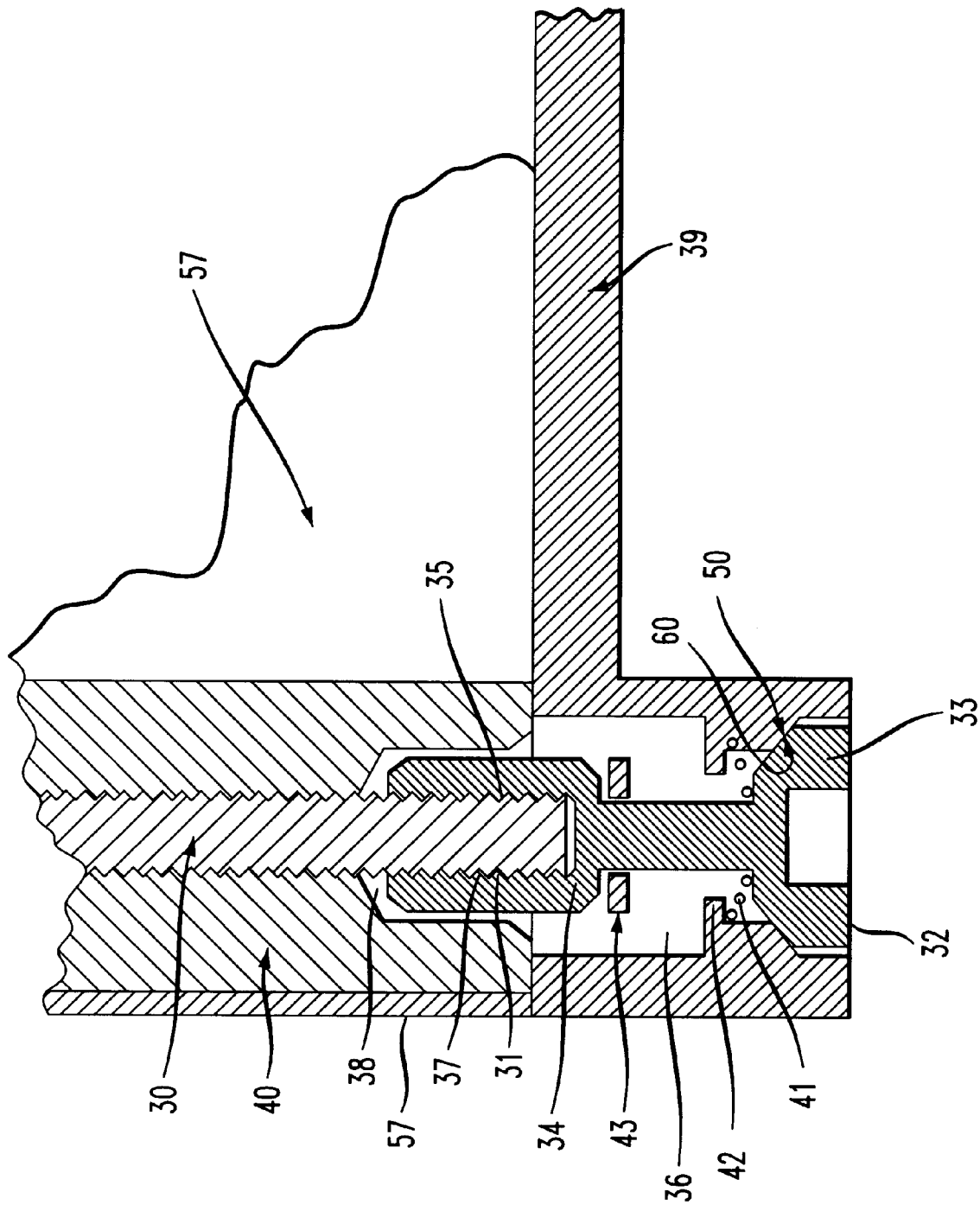
FIG. 3 is a sectional view of the connector of FIG. 2 having the nut within the cabinet.

FIG. 2 shows an alternative embodiment of the invention. Connector 32 is a female screw with a head 33 having a tapered surface 60 and shaft portion 34. Shaft 34 has an inner wall 31, preferably, having threads 37 on at least a portion of inner wall 31. Connector 32 is located within an aperture 36 of door 39. A substantially conical spring 41 is attached to one end of a retaining surface 42 within aperture 36 and at another end to connector 32. Conical spring 41 biases connector 32 away from a receiving body 40 and keeps connector 32 inside door 39. A retainer 43, sized and shaped to engage shaft 34 and to seat against retaining surface 42 at an opposite end of spring 41, retains connector 32. Retainer 43 also prevents connector 32 from sliding out of door 39. In this embodiment, receiving body 40 is a nut affixed to cabinet 57. The nut may also be affixed to the outside of cabinet 57, as shown in FIG. 3. In this embodiment, a stud 30, located in a receptacle 38, in receiving body 40, or clearance hull, preferably, has threads 35 on its outside and threadingly engages threads 37 of inner wall 31. When door 39 is closed, door 39 is centered as shaft 34 engages with stud 30 and tapered surface 60 engages with a tapered surface 50 of door 39. Preferably, for centering purposes, there should be a minimum distance between shaft 34 and receiving body 40 in receptacle 38. In yet another embodiment, the connector may be replaced with a captive nut spring.

While this invention has been described in conjunction with specific embodiments thereof, it is evident that many alternatives, modifications, and variations will be apparent to those skilled in the art. Accordingly, the preferred embodiments of the invention set forth herein are intended to be illustrative and not limiting. Various changes may be made without departing from the spirit and scope of the invention as defined in the appended claims. For example, connector 2 may be made from any number of different materials so long as they provide sufficient strength and durability qualities. Also, the degree of taper may be changed, dimensions may be altered and numbers of threads may be changed to suit particular needs for particular uses.

What is claimed is:

1. A self aligning connecter to engage with a tapered surface of a body to be connected to a receiving body comprising:

a head having a tapered surface capable of engaging said tapered surface of said body to be connected to said receiving body;

a shaft portion connected to said head; and a substantially conical spring having an end portion engaging said head and/or said shaft portion and another end portion engaging a surface of said body to be connected opposing a retaining surface, said spring biasing said head and/or shaft away from said receiving body.

2. The connector as defined in claim 1 further comprising external threads positioned on at least a portion of said shaft portion and capable of threadingly engaging internal threads formed in said receiving body.

3. A self aligning connector to engage with a tapered surface of a body to be connected to a receiving body comprising:

a head having a tapered surface capable of engaging said tapered surface of said body to be connected to said receiving body;

a shaft portion connected to said head;

a retainer sized and shaped to engage said shaft portion and to seat against a retaining surface of said body to be connected to said receiving body; and a substantially conical spring having an end portion engaging said head and/or said shaft portion and another end portion engaging a surface of said body to be connected opposing said retaining surface, said spring biasing said head and/or said shaft away from said receiving body.

4. The connector defined in claim 3 wherein said head is flat.

5. The connector defined in claim 3 wherein said retainer is a rubber washer pressed over said shaft portion.

6. The connector defined in claim 3 wherein said body to be connected is a door having an aperture to receive said spring, said shaft portion, said head, and said retainer.

7. The connector defined in claim 6 wherein said door has a plurality of apertures to fit a plurality of said connectors.

8. The connector defined in claim 3 wherein said connector is a bolt.

9. The connector defined in claim 3 wherein said receiving body is a nut within a cabinet.

10. The connector defined in claim 3 wherein said receiving body is a nut affixed to a cabinet.

11. The connector as defined in claim 3 further comprising external threads positioned on at least a portion of said shaft portion and capable of threadingly engaging internal threads formed in said receiving body.

12. The connector defined in claim 11 wherein said retainer is a threaded washer threadingly engaging said external threads.

13. The connector defined in claim 11 wherein said connector is a screw.

14. A self aligning screw to engage with a tapered surface of a door to be connected to a receiving body comprising:

a head having a tapered surface capable of engaging said tapered surface of said door to be connected to said receiving body;

a shaft portion connected to said head;

external threads positioned on at least a portion of said shaft portion and capable of threadingly engaging internal threads formed in said receiving body;

a retainer sized and shaped to threadingly engage said external threads and to seat against a retaining surface of said door; and a substantially conical spring having an end portion engaging said head and/or said shaft portion and another end portion engaging a surface of said door opposing said retaining surface, said spring biasing said head and/or said shaft away from said receiving body.

15. A self aligning connector to engage with a tapered surface of a body to be connected to a receiving body comprising:

a head having a tapered surface capable of engaging said tapered surface of said body to be connected to said receiving body;

a shaft, a portion of which is hollow, having inner and outer walls, said shaft connected to said head; and a substantially conical spring having an end portion engaging said head and/or said shaft portion and another end portion engaging a surface of said body to be connected opposing a retaining surface, said spring biasing said head and/or said shaft away from said receiving body.

16. The connector defined in claim 15 further comprising internal threads positioned on at least a portion of said inner wall and capable of threadingly engaging external threads formed on a protrusion positioned in a recess on said receiving body.

17. The connector defined in claim 15 further comprising a retainer capable of engaging at least a portion of said outer wall and said retaining surface of said body to be connected to said receiving body.

18. The connector defined in claim 17 wherein said retainer is a slidable C-ring.

19. The connector defined in claim 18 wherein said outer wall has a larger diameter than an inner diameter of said C-ring.

20. A self aligning bolt to engage with a substantially conical seating surface of a door to be connected to a receiving body comprising:

a head having a substantially conical seating surface capable of engaging said conical seating surface of said body to be connected to said receiving body;

a shaft, a portion of which is hollow, having inner and outer walls, said shaft connected to said head;

internal threads positioned on at least a portion of said inner wall and capable of threadingly engaging external threads formed on a stud positioned in a clearance hull in said receiving body;

a retainer capable of engaging at least a portion of said outer wall and a retaining surface of said door; and a substantially conical spring having an end portion engaging said head and/or said shaft portion and another end portion engaging a surface of said body to be connected opposing a retaining surface, said spring biasing said head and/or said shaft away from said receiving body.

21. The bolt defined in claim 20 wherein said stud centers said bolt in said clearance hull.

\* \* \* \* \*